Figure 1:
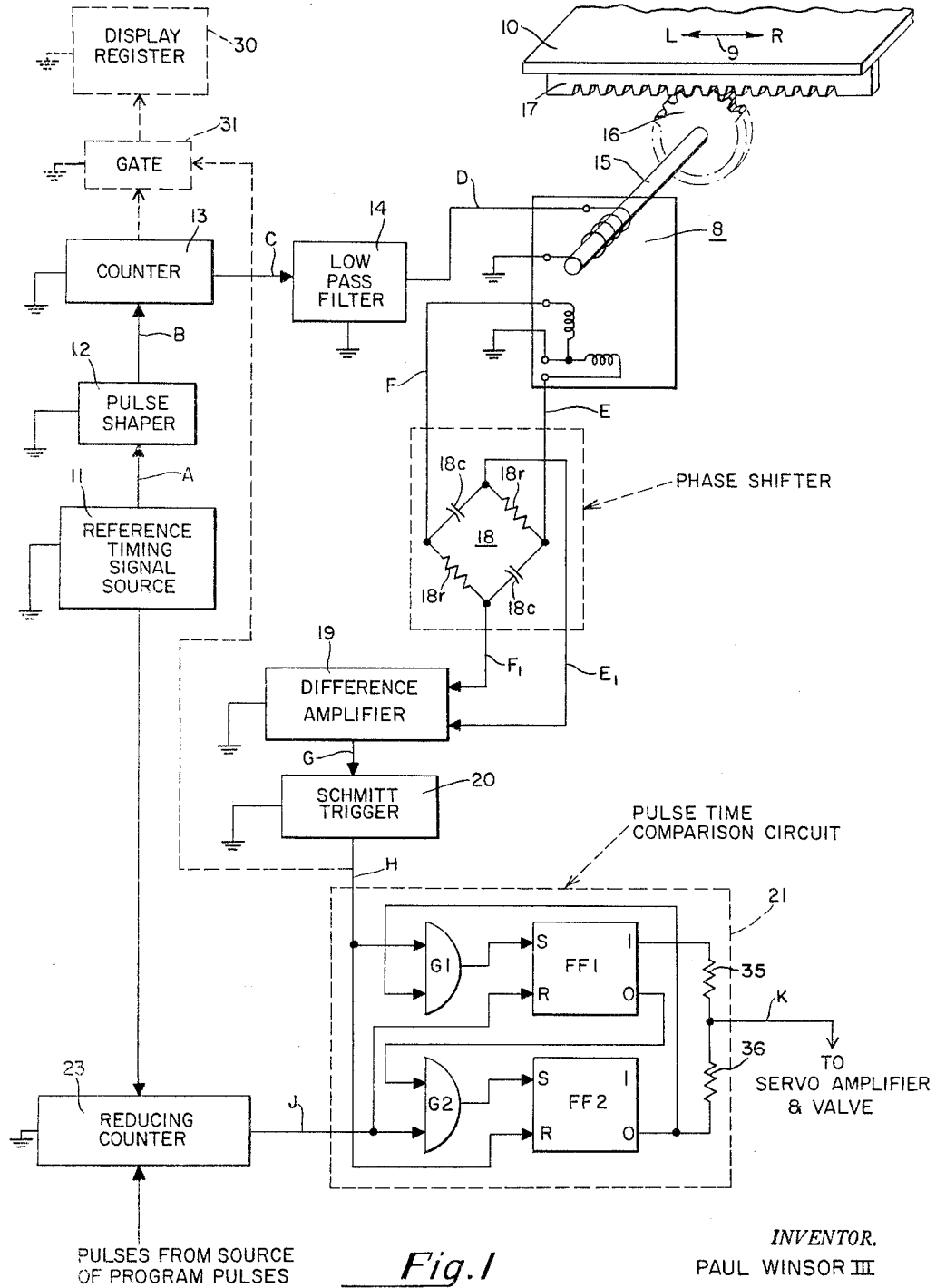

Jan. 4, 1966  P. WINSOR III  3,227,863
DIGITAL POSITION CONTROL AND/OR INDICATING SYSTEM
Filed Aug. 3, 1961  3 Sheets-Sheet 1

PULSES FROM SOURCE
OF PROGRAM PULSES

INVENTOR.
PAUL WINSOR III
BY
Nelson E. Kimmelman
ATTORNEY

Jan. 4, 1966 P. WINSOR III 3,227,863
DIGITAL POSITION CONTROL AND/OR INDICATING SYSTEM
Filed Aug. 3, 1961 3 Sheets-Sheet 3

INVENTOR.
PAUL WINSOR III
BY
Nelson E. Kimmelman
ATTORNEY

United States Patent Office 3,227,863
Patented Jan. 4, 1966

3,227,863
DIGITAL POSITION CONTROL AND/OR
INDICATING SYSTEM
Paul Winsor III, Paoli, Pa., assignor to Auerbach Electronics Corporation, Philadelphia, Pa., a corporation of Pennsylvania
Filed Aug. 3, 1961, Ser. No. 129,072
12 Claims. (Cl. 235—151.11)

This invention relates to an error measurement system and in particular to control, indicating or recording systems in which an error or other useful signal is derived by comparison of sets of digital pulses.

There are, of course, many systems known in the prior art for control of various operations such as machine operations in automated factories. While there are many different techniques for accomplishing this objective with adequate accuracy and speed, some of these techniques involve much more accurate measurement than is needed in many applications. It is therefore desirable in certain applications to provide a system which is able to furnish the desired control within the proper range of accuracy and speed yet which is relatively inexpensive and reliable so as to be commercially competitive.

Among known approaches to this problem are analog and digital systems. Digital systems of sensing the condition of a variable such as the position of a work table for an automatic punch press, for example, include pulse counting systems and "absolute value" devices. Pulse counting systems are chiefly useful where the varying condition is frequently returned to a datum point. In these systems digital pulses are generated in response to movement of the table from a datum point. They may employ a pulse-producing apparatus coupled to a rack-and-pinion assembly. If such systems are applied to sensing of successive variations without reference to a datum point, errors accumulate and loss of power or intermittent failure of the apparatus may require the condition to return to the datum point again.

The absolute value system includes such devices as shaft-position encoders, and linear devices such as the "Inductosyn," and optical grating systems. Most of the linear devices are very accurate over a short span but are characterized by repeating their measurements when this span is exceeded so that ambiguities may be introduced which have to be resolved by another coarse measuring device. Thus, as is the case with digital systems, linear systems also may require a rack-and-pinion assembly for coarse measurement to resolve ambiguities.

As between digital shaft position encoders and analog transducers, the latter generally are more compact and considerably less expensive than the former and in addition may have higher reliability and longer life. Once the analog signals representative of the variable are obtained, it would be desirable to convert the system to a digital system. In this way the waveshape, drift, or amplitude distortion problems that are common in analog signal systems may be avoided. Furthermore, the use of digital signals permits the application of various techniques for simplifying the system with consequent cost reductions.

It is therefore an object of the present invention to provide novel control, indicating or recording systems for producing an error or other useful signal in response to digital pulses.

Another object of the invention is to provide a novel control, indicating or recording systems which use essentially digital techniques thereby avoiding ampliture distortion problems common to analog systems.

Still another object of the invention is to provide novel control, indicating or recording systems which are simpler and less expensive than comparable systems known to the prior art.

In addition to the consideration previously mentioned, it would be highly desirabel to provide servo-control, indicating or recording systems which employ easily available standard components to generate signals representative of a varying condition. Although high precision devices for generating such signals are available, many of them, such as photo-electric encoders, are extremely expensive. Other available transducers such as code wheels, which are not as expensive as photo-electric encoders, require contact brushes that necessitate special logic circuits and are subject to brush wear.

It is therefore another object of the present invention to provide novel control, indicating or recording systems which employ relatively inexpensive rotary motion transducers.

Yet another object of the invention is to provide novel control, indicating or recording systems which can utilize highly developed, accurate and relatively inexpensive rotary motion transducers.

Still other objects of the invention will be apparent upon perusal of the drawings, specification and claims herein.

Figure 2:
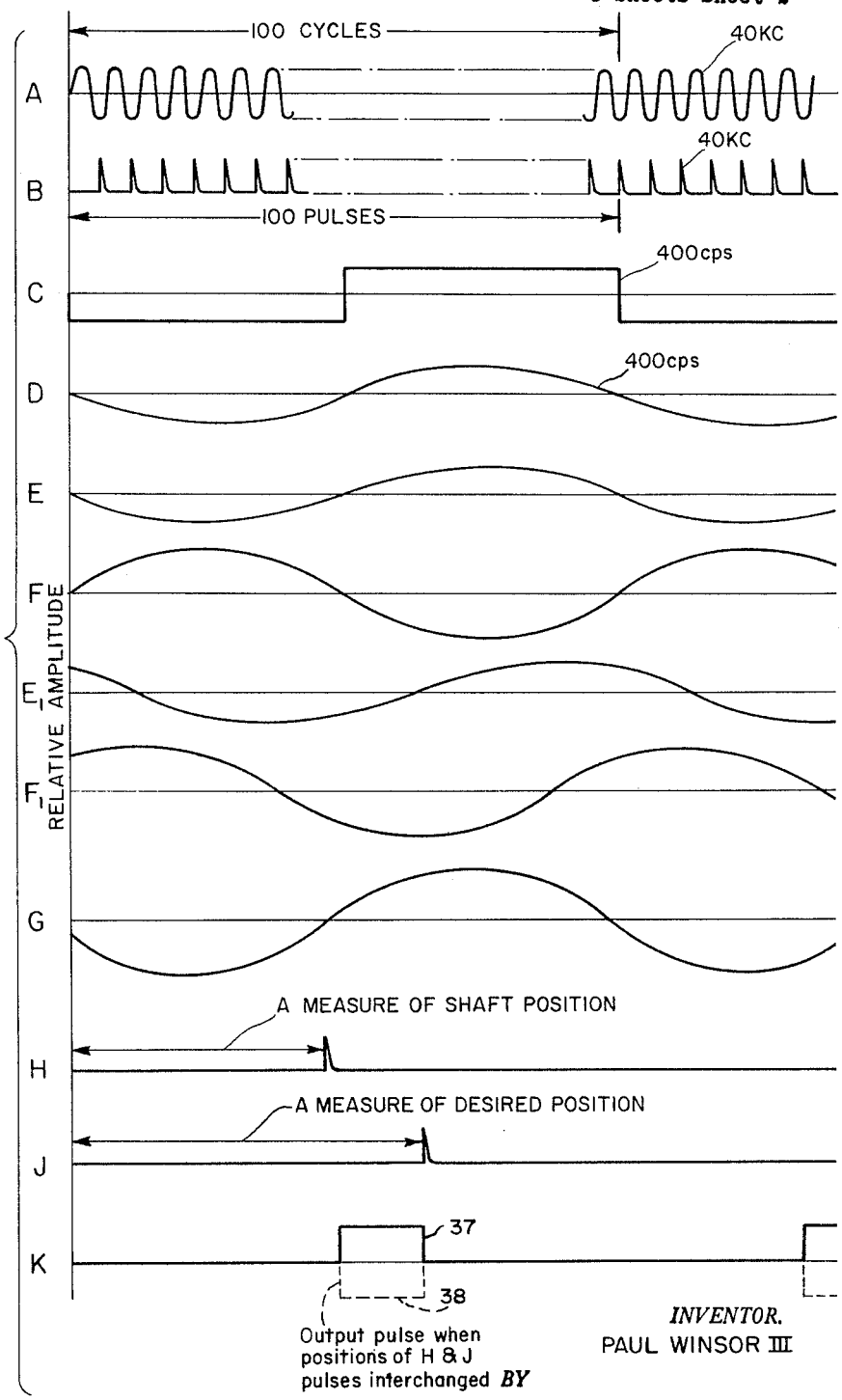
Figure 3:
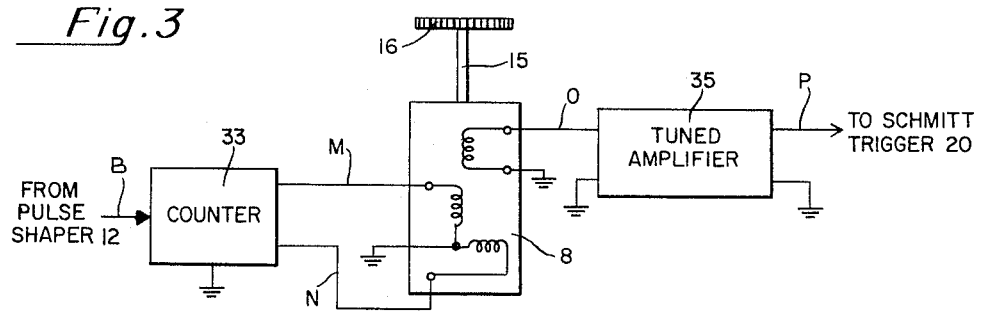
Figure 4:
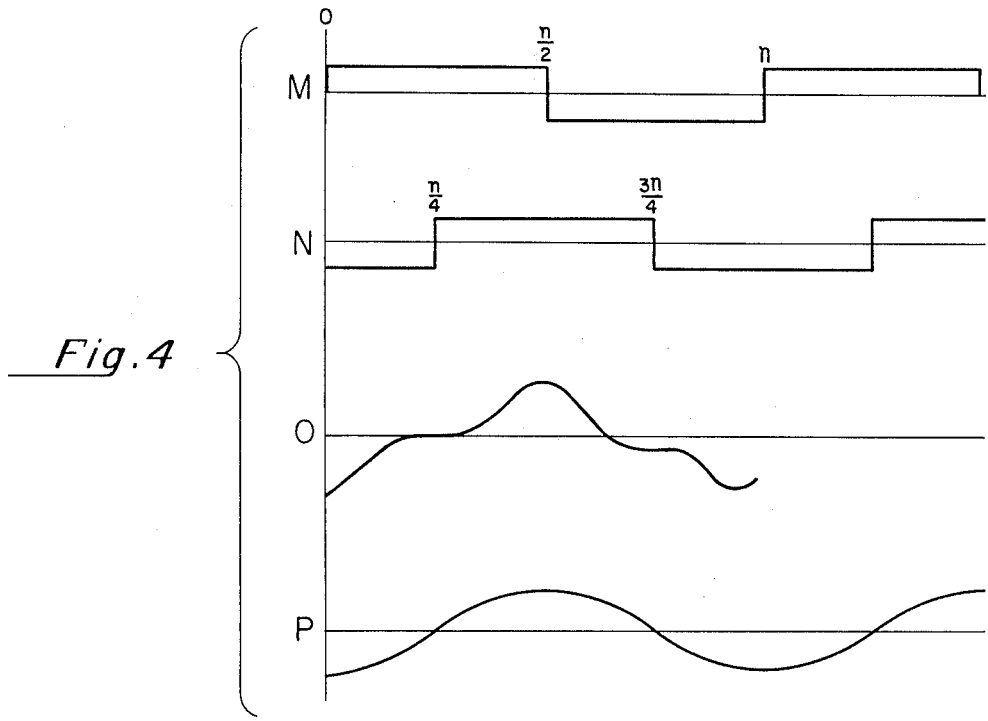

FIGURE 1 is a schematic representation of one form of my invention;
FIGURE 2 shows waveforms of signals as they appear at various points in the system shown in FIG. 1;
FIGURE 3 is a block diagram of an alternative form that part of the system shown in FIG. 1 may take; and
FIGURE 4 is a group of waveforms illustrative of the operation of the alternative form shown in FIG. 3.

In accordance with the present invention I provide novel control, indication or recording systems for producing an error or other useful output signal representative of the departure of a varying condition from a predetermined desired condition by comparing the relative time-positions of two sets of time-varying digital pulses. One set of pulses represents the actual variations in the condition, the other represents the desired condition. Both sets of pulses have their resepctive time-positions derived in relation to a set of the same reference time pulses. In one form of the invention the first set of pulses representing the actual variations are derived by first producing analog signals representative of the varying actual condition and then converting them to digital pulses whose position in time varies to correspond to the changes in the condition. The second set of pulses is produced by counting, in response to the set of reference time pulses, programmed pulses representing a predetermined desired condition of the variable. This second set of pulses has a time-position which corresponds to the deviation of the programmed pulses from the reference pulses. The first and second sets of pulses are then applied to a comparison circuit which produces an error signal whose polarity indicates the direction of correction of the condition desired and whose amplitude indicates the amount of correction needed in that direction.

Solely to aid in explaining the invention, it will be assumed that the invention is being used for controlling the position of a workpiece table such as the table 10 shown in FIG. 1 along one axis, i.e., left or right as indicated by the arrow 9. It should be understood, however, that this illustration is simply for explanation purposes and is not intended to be in any way limiting as to the application or scope of the invention. Waveforms which are purely illustrative and not necessarily exact at points in FIG. 1 designated by letters are shown in correspondingly lettered parts of FIG. 2.

Derivation of first set of pulses

As shown in FIG. 1 there is coupled to a conventional rack 17 at work table 10. A conventional pinion 16, which meshes with the teeth in the rack 17, is coupled to the rotor of a conventional two-phase resolver 8 by a shaft 15. (It should be understood that three-phase devices can alternatively be used.) The rotor winding is energized by a sine wave having a frequency of, say 400 cycles which appears at the output of low pass filter 14. The sine wave is derived from a source of reference timing or clock pulses such as a 40 kc. crystal oscillator in the reference timing signal source 11. The output wave (curve A, FIG. 2) of source 11 is shaped as desired by a conventional pulse shaper 12 (curve B, FIG. 2) and applied to the input of a conventional counter 13 where the 40 kc. wave is divided in frequency to become a 400 c.p.s. square wave (curve C, FIG. 2). This square wave is filtered in the low pass filter 14 to eliminate harmonics and its 400 cycle fundamental sine wave (curve D, FIG. 2) appears at its output terminals. If the input sine wave to the resolver's rotor, has the equation:

$$E_0 = E \sin \omega t \quad (1)$$

then the signals induced in the two stators (curves E and F, FIG. 2) will have the following equations:

$$E_1 = E \sin \omega t \sin \theta \quad (2)$$
$$E_2 = E \sin \omega t \cos \theta \quad (3)$$

where $\theta$ is the rotor shaft angle. As may be seen by the equations, each of the stator voltages is electrically in phase with the primary voltage and their respective amplitudes are sinusoidal functions of the angular position of the rotor. Since it is desired to convert the position of the table 10 measured in the direction of the arrow 9 into an analog signal representative thereof, i.e., to derive the rotor shaft angle $\theta$, and the information contained within these two stator signals is in the form of amplitude modulation, these two signals must first be converted to a different signal from which the phase angle $\theta$ can be directly determined.

One way of doing this (not shown) is to shift one of the stator signals 90° with respect to the rotor signal, add the shifted signal to the other stator signal, and then compare the phase of the added signals with respect to the rotor signal. Thus, shifting $E_1$ by 90° in terms of rotor signal gives $$E_1 = E \sin (\omega t + 90°) \sin \theta \quad (4)$$
$$= E \cos \omega t \sin \theta \quad (5)$$

Adding $E_1$ and $E_2$ gives $$E_{1+2} = E \cos \omega t \sin \theta + E \sin \omega t \cos \quad (6)$$
$$= E \sin (\omega t + \theta) \quad (7)$$

The signal given by the Equation 7 is then compared in phase with the signal of Equation 1.

Another way, which is more practical and is shown in FIG. 1, is to advance the phase of one stator signal by 45° and delay the other 45° by using RC circuits wherein 45° phase shifts are readily obtainable at the half-power frequencies. This may be accomplished by applying the two signals (Equations 2 and 3) induced in the stators to a phase-shift circuit 18. A typical phase-shift circuit 18 which performs the required transformation is shown in FIG. 1. This circuit includes capacitors 18c and resistors 18r in a bridge configuration.

To obtain digital signals corresponding to the phase difference between the rotor signal (Equation 1) and the added signal (Equation 7) the output (curves E1 and F1, FIG. 2) of the phase-shift bridge 18 is first applied to a conventional differential amplifier 19 such as the one described in Section 11.10 of "Vacuum Tube Amplifiers," volume 18 of the Radiation Laboratories Series. Amplifier 19 produces an output signal (curve G1, FIG. 2) corresponding to the difference in the voltages induced in the stators. The output signal of the differential amplifier 19 is then applied to a zero-crossing detector or trigger circuit such as a conventional Schmitt trigger circuit 20. This circuit indicates the time of the crossing of the zero-axis by the output signal of amplifier 19. It is constructed to produce an output pulse (curve H, FIG. 2) each time the signal passes through zero in a given direction (i.e., positive or negative-going).

The output signal of the trigger circuit 20 is then applied to a pulse-time comparison circuit 21. It is the latter circuit which compares the time of occurrence of the first set of variable pulses (i.e., actual worktable-position-representative set of pulses) with the second set of program pulses to derive an output error signal for controlling the condition of the variable.

Derivation of second set of pulses

Turning now to the portion of my novel system which produces the set of pulses corresponding to the deviation of the programmed pulses from the clock pulses there is provided a reducing or reversible counter circuit 23 such as the one described on pages 335 and 655 of "Pulse and Digital Circuits" by Millman and Taub (McGraw-Hill, 1956) to which program pulses from a register (not shown), for example, are applied. The register may be coupled to any appropriate source of program pulses such as a punched-tape reader, although any other source may be used if desired. Since it is desired to compare the time-positions of the first and second sets of pulses, the repetition rates of both sets must be the same. Thus, since the first set has a repetition rate of 400 c.p.s., the counter 23 will also be constructed to count up to 100.

To the counter 23 are applied the 40 kc. clock pulses from the reference source 11, each pulse applied reducing the two digit number in the counter by one. If the counter is set up to count 100 pulses, it counts down from the two digit number stored therein toward zero and possibly beyond until 100 pulses from the oscillator 11 have been applied whereupon it is reset. Each time that the counter passes through zero it produces an output pulse. Thus, if the number applied to the counter is say, 65, the counter 23 will produce an output pulse after 65 pulses from the source 11 are received. If the number in the counter 23 is only 35, then the counter 23 will produce an output pulse after only 35 pulses from the source 11 are received. Consequently, depending upon the number represented by the program pulses applied to the counter, the output wave of the counter 23 will consist of pulses (curve J, FIG. 2) whose time-position depends upon the number of clock pulses required to cause the counter to produce an output pulse. This time-position-modulated pulse train is applied to the comparison circuit 21 which is constructed to produce an output error signal (curve K, FIG. 2) consisting of pulses whose polarity indicates the direction of necessary correction of the variable condition and whose width is proportional to the amplitude of the error it is desired to correct.

Pulse Comparison Circuit

A circuit which may be used as the comparison circuit 21 is shown in FIG. 1 and consists of AND-gates G1 and G2, flip-flop circuits FF1 and FF2 and resistors 35 and 36. Initially the flip-flops FF1 and FF2 are reset so that the error signal at the junction of resistors 35 and 36 is zero. When the worktable-position-representative pulses from the trigger circuit 20 occur before the pulses from the counter 23, flip-flop circuit FF1 is set by means of a pulse from gate circuit G1, the circuit FF2 being constructed to be "enabled" when the output of flip-flop FF1 is reset. Circuit FF2 is not affected by the arrival of the position-representative pulse. When the program-representative pulse is applied to gate G2 and to the flip-flop FF1, it causes the circuit 33 to be reset, and the circuit 33 thereupon produces a disabling input signal to the gate G2. Thus, the circuit FF1 remains reset. In this case, therefore, the error signal will consist of a positive pulse 37 (curve K, FIG. 2) whose width is proportional to the difference in the respective times of arrival of the position and program-representative pulses.

On the other hand, if the pulse from counter 23 occurs first, the gate G2, which is enabled by the output of the circuit FF1, sets the flip-flop FF2 whereupon the output signal of the latter disables the gate G1 thereby preventing circuit FF1 from being set. Subsequently, when the position-representative pulse arrives it resets the circuit FF2 thereby producing a negative output pulse 38 (curve K, FIG. 2) whose width is a function of the difference in the arrival times of the actual position and program-representative pulses respectively. Thus the error signal consists of 400 c.p.s. pulses which may be applied to a filter (not shown) and thence to an appropriate servoamplifier via suitable waveform shaping circuits (not shown).

*FIG. 3 operation*

FIGURE 3 shows how another subassembly may be employed to simplify the overall system shown in FIG. 1. By employing this circuit, low pass filter 14, phase shifter 18 and differential amplifier 19 may be dispensed with. The output of the pulse shaper 12 is fed to a special counter circuit which is constructed to produce two output square waves (shown in parts M and N of FIG. 4) which are displaced in phase from one another by 90°. These square waves will contain a fundamental component at 400 c.p.s. and higher odd harmonics which are free from intermodulation because the resolver is a linear device. The two waves M and N are applied to the stator windings of the resolver (in contradistinction to the system shown in FIG. 1 ) and the output of the resolver will be a complex wave which is represented, for illustrative purposes only, by the purely arbitrary waveform in Part O of FIG. 4. The latter wave is applied to a tuned amplifier 35 which is tuned to the fundamental frequency and thereby extracts the fundamental component shown in Part P of FIG. 4. The phase of the fundamental component is a function of the resolver's rotor shaft angle. The fundamental is then applied to the Schmitt circuit 20 which detects the desired zero-axis crossing and generates pulses to correspond thereto and the system of FIG. 1 otherwise operates in the same way. The waves M and N need not be square waves, as they could alternatively be sinusoids, but it is relatively costly to generate matched quadrature-phase-related sinusoids. Regardless of the waveforms of the exciting signals, the phase angle of the resolver's output (rotor) signal will be the same as the actual angle of the rotor shaft itself.

The actual generation of the quadrature-phase-related exciting waves may be accomplished by two flip-flop circuits within the counter 33. Pulses at times $t_0$ and $t_{n/2}$ generated by previous stages within the counter 33 are applied to the set and reset inputs respectively of the first flip-flop while pulses at times $t_{n/4}$ and $t_{3n/4}$ are applied to the respective set and reset inputs of the second flip-flop, $n$ being the modulo of the counter.

*Alternative constructions*

While the invention has been described in terms of a system in which there is just one resolver and the apparatus is controlled in its movement along a single axis (represented by the arrow 9, FIG. 1), it should be appreciated that for greater accuracy and resolution, other resolvers and associated circuitry can be coupled to the first resolver. Thus, the resolver coupled to the rack and pinion could be a vernier resolver having a repetitive period of, say 0.1 inch whereas a medium "speed" resolver could be coupled to the vernier resolver by gears for example, attached to the rotor shaft, so that it would make one revolution every five inches. In addition, a coarse resolver and its associated circuitry could be similarly coupled to the medium resolver. The coarse resolver might be constructed, for example, to make one revolution for every 200 inches of travel of the controlled apparatus. If additional resolvers are used, separate phase-shifting networks, differential amplifiers, Schmitt trigger circuits, pulse-time-comparison circuits, and reversible counters for each resolver could be employed in sequence. Thus, after the coarse chain operation was completed and the rack was positioned accordingly, the second or "medium speed" chain would be brought into play to produce an error signal for moving the rack. Finally, the vernier resolver and its associated chain would be activated to provide the finest adjustment of the rack. To govern the sequential operation of the separate chains, a control register would be coupled to the comparison circuits of each chain to sequentially activate just one of them at a time.

In addition to using the system for controlling action of a tool or other body along a single axis, it is also adaptable for use with systems in which the controlled tool is moved along multiple axes. For example, it may be desired to control a worktable in two directions in a horizonial plane and a turret along a third axis. To accomplish multi-axis control it would be possible to use parallel chains, i.e., separate resolver assemblies together with separate phase-shift circuits, differential amplifiers, trigger circuits, reducing counters and pulse-time comparison circuits for each axis (as shown in FIG. 1 for one axis only). Of course, to save expense one could dispense with parallel chains for the various axes by using time-sharing techniques since the system is essentially digital. Thus, with the exception of different resolvers for each direction of movement, the same chain comprising a single phase-shift network, differential amplifier, trigger circuit, pulse-time comparison circuit and reducing counter can be used in sequence for the various axes. In a typical setup, for example, there could be a storage register adapted to receive program data from any desired source for each axis. Each of the storage registers would be coupled to a gate to which gating pulses from a control switch circuit would also be supplied during different time intervals. The control switch circuit itself could be coupled to be actuated in response to the output of the frequency dividing counter such as the counter 13. Thus the data stored in the registers could be applied in sequence to the common reversing counter. The control switch circuit could also, in step, enable gate circuits to feed the respective outputs of the different resolvers sequentially to the common phase-shift network, differential amplifier, Schmitt trigger and pulse-time comparison circuit. To avoid transient problems the output of the frequency dividing counter can be simultaneously and continuously applied to all of the resolvers.

It should be remembered that, regardless of the particular form that the invention may take, the various components may differ according to the desired design. The input data representative of the desired position of the controlled apparatus can be derived from punched tape or other storage sources such as magnetic tape. The input storages can be flip-flops, magnetic cores, relays, crossbar switches, normal switches or any other appropriate storage components. The transducers could be synchros as well as resolvers.

In FIG. 1 the system is shown as having a single timing or clock signal source operating at 40 kc. Of course, two separate sources may be employed if they are locked in phase with one another, as by having a common power line frequency which is used as a time base by both.

It should also be borne in mind that the output of the comparison circuit need not be applied to a control circuit or system but could be used for other purposes such as display or recording, or any combination thereof. By the same token, just a portion of the system, i.e., that portion used to generate the first set of pulses, can be used to operate a display system alone or in combination with the overall system shown in FIG. 1. This can be done by coupling the output of the trigger circuit 20 to a gate circuit 31 to which the counter 13 output is also coupled, and also coupling the output of the gate 31 to a conventional display register 30. Thus, when the output pulses of the trigger circuit 20 are produced they enable the number-representative signal then in the counter 13 to be applied to the register 30 for producing a visual representation of the number.

As many other modifications and applications of my invention are possible without departing from the essence of my invention, I desire that the scope of my invention be delineated only by the claims herein.

I claim:

1. A system comprising: a source of reference signals having a predetermined frequency, first means to which said reference signals are applied for producing a first set of signals whose time position is responsive to a varying condition, second means for producing a second set of signals, said second means being constructed to receive signals having the same frequency as said reference signals and bearing a predetermined fixed phase relation thereto, means for applying to said second means signals for controlling said condition, said second set of signals having a time-position substantially determined by said controlling signals, and means responsive to said first and second sets of signals for producing an output signal whose characteristics are related to the difference between the respective time-position of said first and second sets of signals.

2. A system comprising: a source of reference signals, first means coupled to said source to which said reference signals are applied for producing a first set of signals, said first means including means responsive to a varying condition, said first set of signals having a time-position which reflects said varying condition, second means coupled to said source, means for applying program signals for controlling said condition to said second means, said second means producing a second set of signals whose time-position is substantially determined by said program signals, and means to which said first and second sets of signals are applied for producing an output signal of varying polarity which is related to the difference between the time-positions of said first and second sets of signals.

3. An electronic system comprising: a source of reference timing signals, means to which said reference signals are applied which is constructed to produce signals whose phase is modified in response to a varying condition, means responsive to said modified signals for producing a first set of signals whose time-position is related to said phase modification, means coupled to said source and adapted to receive said reference program signals representative of a desired state of said condition and predetermined signals for producing a second set of signals whose time-position is substantially determined by said predetermined program signals, and means to which said first and second sets of signals are applied for producing an output error signal related to the difference between the respective time-positions of said first and second sets of signals, said error signal comprising pulses whose polarity varies depending upon the direction of correction of said varying condition to conform to said program signals and whose width is proportional to the amplitude of said correction.

4. An electronic system comprising: a source of reference timing signals, means coupled to said source for producing derivative timing signals from said timing signals, means to which said derivative signals are applied which is adapted to modify the phase of said derivative signals in response to a varying condition, means responsive to said modified signals for producing a first set of signals whose time-position is a function of said phase modification, means coupled to said source and to a source of program signals representative of a desired state of said condition for producing a second set of signals whose time-position is substantially determined by said program signals, and means to which said first and second sets of signals are applied for producing an output signal representative of the difference between the time-positions of said first and second sets of signals.

5. An electronic control system for a varying condition comprising: a source of reference timing signals, means coupled to said source for producing a sine wave having a frequency lower than said timing signals, electromechanical means responsive to said condition to which said sine wave is applied, said electromechanical means being constructed and arranged to modify the phase of said applied sine wave to correspond to variations of said condition, means responsive to said modified sine wave for producing a first set of pulses whose time-position represents the variations of said condition, counting means coupled to said source and adapted to receive program signals representing desired states of said condition, said counting means being constructed and arranged to produce a second set of pulses whose time-position represents said desired states, and pulse-time comparison means to which said first and second sets of pulses are applied which produces an output signal indicative of the difference between said varying conditions and said desired states.

6. An electronic system comprising: a source of reference timing signals, means coupled to said source for producing derivative reference signals from said timing signals and which have a frequency lower than the latter signals, an electromechanical means which includes a movable member to which said derivative signals are applied, said electromechanical means being constructed to produce two output signals in response to movement of said member, said output signals containing phase information representative of said movement, phase-shifting means to which said output signals are applied for producing a phase angle of 90° between said output signals, means responsive to said phase-shifted output signals for producing a bidirectional difference signal representing the voltage difference between said phase-shifted signals, means to which said difference signal is applied for producing a first set of pulses when said difference signal crosses the zero axis, counting means coupled to receive timing signals from said source and adapted to receive program signals which represent a desired position of said movable member, said counting means being constructed and arranged, in response to the signals supplied thereto, to produce a second set of pulses whose time-position represents said desired position of said movable member, and pulse-time comparison means to which said first and second sets of pulses are applied for producing an error signal indicative of the difference between the actual position of said movable member and the desired position thereof.

7. An electronic control system comprising: a clock oscillator operating to produce a first signal wave at a first frequency, means responsive to said first signal for producing a sine wave having a frequency which is a submultiple of said first frequency, a two-phase resolver to whose primary winding said sine wave is applied, said resolver having a rotor adapted to be coupled to a part which is to be controlled, said resolver having two secondary stator windings in which are induced two stator signals from which the angular position of the resolver's rotor may be ascertained, phase-shifting means to which said stator signals are applied for producing a phase angle of 90° between said stator signals, means responsive to said phase-shifted signals for producing a bidirectional difference signal representing the voltage difference between said phase-shifted signals, means to which said difference signal is applied for producing a first set of pulses when said difference signal crosses the zero-axis in a predetermined direction, a reversing counter to which said first signal wave and program pulses are applied, said counter being constructed to produce a second set of pulses when the number represented by said program pulses in said counter is reduced to zero in response to said first signal wave, and a pulse-time comparison circuit to which said first and second sets of pulses are applied, said comparison circuit producing an error signal comprising pulses of varying polarity and width, the polarity of said error signal being indicative of the direction of corrective movement of said controlled part and the pulse width thereof being indicative of the distance of said corrective movement.

8. A signalling system comprising:
  (a) means for producing a selected number of reference timing signals, said means including means for producing two identical timing signals displaced by 90° in phase from one another,
  (b) means to which said timing signals are applied and which responds to variations in a predetermined condition by producing an output signal containing phase information which corresponds to said variations, said (b) means including a resolver having two stator windings to which said two signals are respectively applied,
  (c) means responsive to said output signal for producing pulses whose time position corresponds to said variations, said (c) means including frequency selective means for extracting the fundamental component of said output signal, the phase of said component corresponding to said variations, and
  (d) utilization means responsive to said pulses.

9. The signalling system according to claim 8 wherein said utilization means includes means coupled to said means for producing said timing signals to provide visible indications corresponding to said variations.

10. An indicating system for indicating a varying condition comprising:
  (a) means including counting means for producing a selected number of reference timing signals,
  (b) means responsive to said condition to which said timing signals are applied, said (b) means including an electromechanical device responsive to rotary movement and producing an output signal whose phase corresponds to variations in said condition,
  (c) means responsive to said output signal for producing a set of pulses whose time-position corresponds to said variations, and
  (d) means coupled to said counting means and responsive to said set of pulses for providing indications of the number being counted in said timing means at the time said pulses occur, said (d) means including a gate circuit to which said counting means and said pulse producing means are coupled and also includes a display device coupled to the output of said gate circuit, said gate circuit being actuated by said pulses to permit number-representative signals from said counting means to be applied to said display device.

11. An indicating system for a varying condition comprising: a source of reference timing signals, means including a counting means coupled to said source for producing a sine wave having a frequency lower than said timing signals, means to which said sine wave is applied and which is responsive to said condition, said last-named means being constructed and arranged to modify the phase of said applied sine wave to correspond to variations of said condition, means responsive to said modified sine wave for producing a set of pulses whose time-position represents the variations of said condition, and means coupled to said counting means and responsive to said set of pulses for providing indications of the number being counted in said counting means at the time said pulses occur.

12. An electronic signalling system comprising: a source of reference timing signals; means to which said reference signals are applied which is constructed to produce at least one signal whose phase is modified in response to a varying condition, said means comprising first pulse-producing means for producing two identical substantially rectangular-waveform-signals which are displaced in phase from one another by 90°, a resolver whose rotor shaft is moved in response to said varying condition, said resolver having two stator windings to which said two signals are respectively applied, and frequency selective means coupled to the rotor winding of said resolver for extracting the fundamental component of the signal induced in said rotor winding; means to which said extracted component is applied for producing a first set of signals whose timeposition is related to the phase of said extracted component; means to which said reference signals and other predetermined signals are applied for producing a second set of signals whose time-position is related to said predetermined signals; and means to which said first and second sets of signals are applied for producing an output signal related to the difference between the respective time-positions of said first and second sets of signals.

References Cited by the Examiner

UNITED STATES PATENTS

| | | |
|---|---|---|
| 2,736,889 | 2/1956 | Kaiser et al. |
| 2,817,775 | 12/1957 | Rosenberg et al. |
| 2,867,791 | 1/7959 | Goldberg et al. ____ 235—151 X |

OTHER REFERENCES

Pages 6–8 to 6–21, 1957, Susskind, Notes on Analog-Digital Conversion Techniques, Technology Press, Massachusetts Institute of Technology.

Pages 29–14 to 29–15, 1959, Grabbe et al. Handbook of Automation, Computation, and Control, vol. 2, John Wiley and Sons, Inc., New York.

MALCOLM A. MORRISON, *Primary Examiner.*

WALTER W. BURNS, JR., *Examiner.*

C. L. WHITHAM, K. W. DOBYNS, *Assistant Examiners.*